April 12, 1949.　　　　　L. R. O'NEILL　　　　　2,467,091
ELECTRODE MAINTENANCE DEVICE

Filed May 4, 1946　　　　　　　　　　　　2 Sheets-Sheet 1

INVENTOR.
LOUIS R. O'NEILL
BY
Michael Williams
ATTORNEY

April 12, 1949.  L. R. O'NEILL  2,467,091
ELECTRODE MAINTENANCE DEVICE
Filed May 4, 1946  2 Sheets-Sheet 2
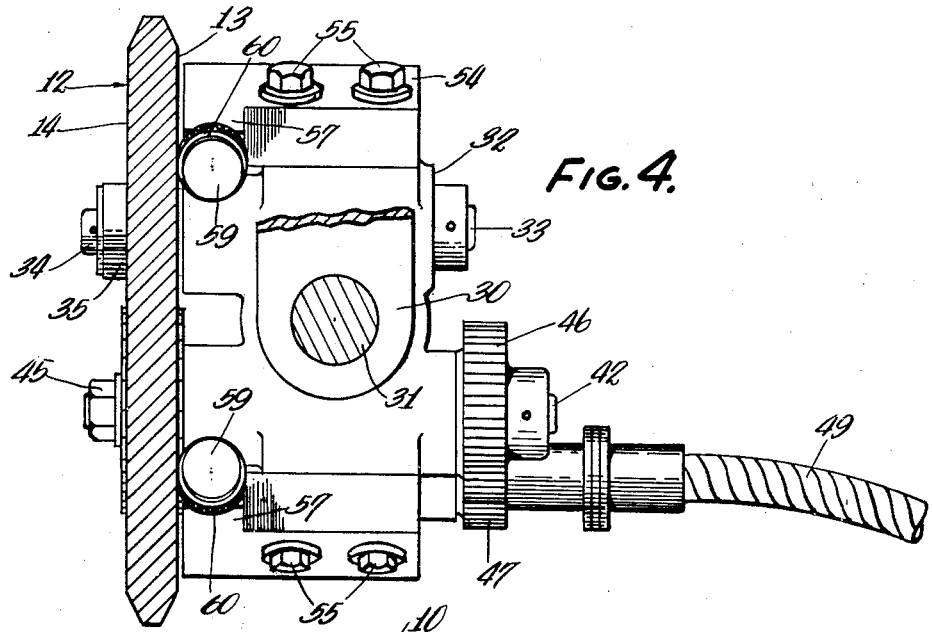
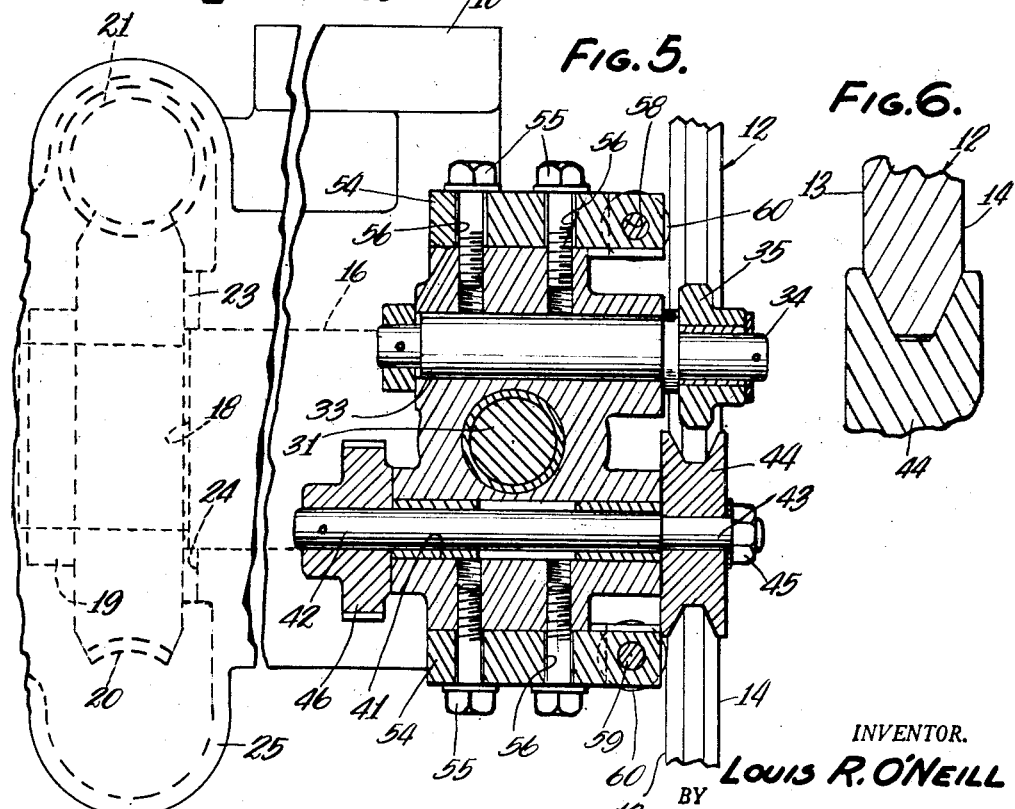
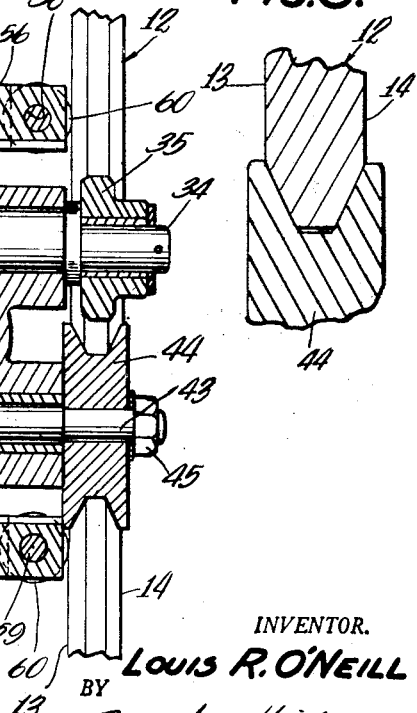
INVENTOR.
Louis R. O'Neill
BY Michael Williams
ATTORNEY Patented Apr. 12, 1949

2,467,091

UNITED STATES PATENT OFFICE 2,467,091

ELECTRODE MAINTENANCE DEVICE

Louis R. O'Neill, Warren, Ohio, assignor to Federal Machine and Welder Company, Warren, Ohio, a corporation of Ohio Application May 4, 1946, Serial No. 667,439

7 Claims. (Cl. 219—4)

My invention relates to electrode maintenance devices, more particularly to such devices for use with electrical resistance welders of the so-called seam welding type employing at least one rotary electrode, and the principal object of my invention is to provide new and improved devices of this character.

The electrodes used in resistance welding are usually made of copper or copper alloy so as to provide minimum resistance to flow of electrical current. Heretofore, it has always been a problem to maintain the electrodes in proper condition, since, under the welding pressures required, the electrodes have a tendency to "mushroom" or spread at their work engaging portions. This is undesirable since careful study has shown that the work engaging surface of the electrode should bear a definite relation to other variables, such as material, material thickness, welding current, and welding pressure, so that if the electrode "mushrooms," the welding face is changed and this disturbs its relation with the variables.

When the electrode face "mushrooms" it widens, and thus applies welding current over a greater area of the work than was calculated, so that heat is not localized, and improper welding results.

Also, during welding operation, the electrode, under certain conditions, has a tendency to "pick-up," that is, portions of the work tend to stick to the electrode. In cases of certain materials where the "pick-up" is uniform along the periphery of the electrode, this is not detrimental, but is sometimes beneficial. However, "pick-up" is quite frequently undesirable, since it is not uniform, and in some cases, even if uniform, produces unsatisfactory welding conditions, and my invention also provides means for removing "pick-up."

The prior art shows various methods and means for dressing the peripheral portion of a rotary electrode, but none solves the problem so successfully as the present invention, because none recognizes existing difficulties, as will appear later.

In the drawings accompanying this application, and forming a part of this specification, there is shown, for purposes of illustration, an embodiment which the invention may assume, and in these drawings:

Figure 4 is a sectional view corresponding generally to the line 4—4 of Figure 1, parts being broken away, Figure 5 is a broken sectional view corresponding generally to the line 5—5 of Figure 1, and Figure 6 is an enlarged fragmentary sectional view of a detail.

Figure 1:
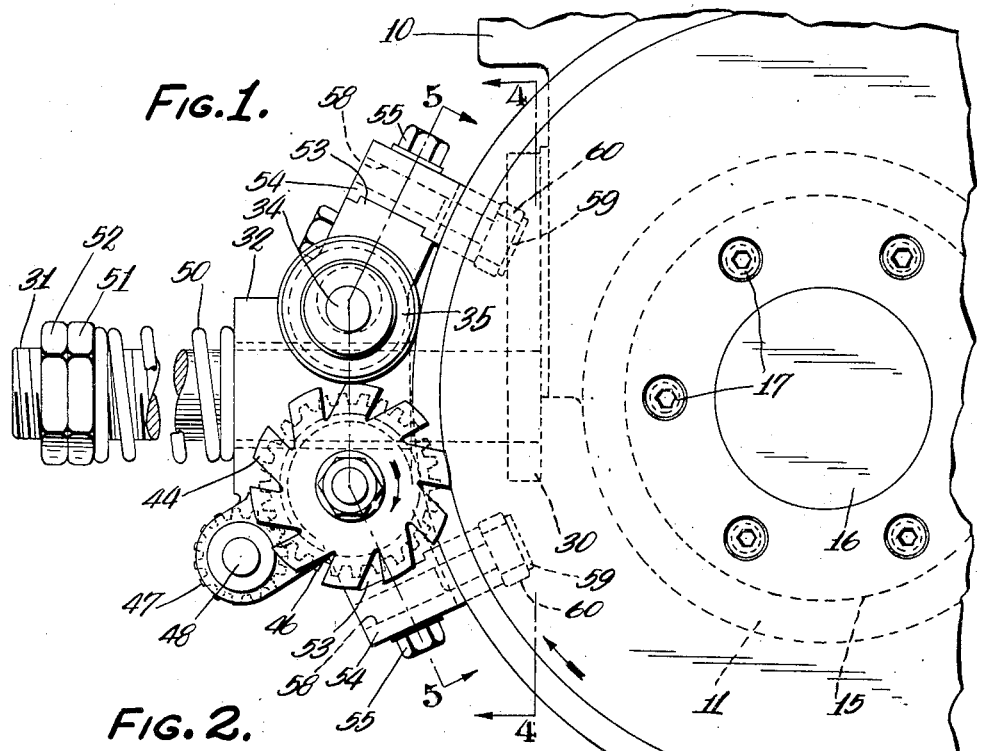
Figure 1 is a broken front elevational view of a portion of an electrical resistance welding machine, disclosing an embodiment of the invention.

Referring particularly to Figure 1 of the drawings, the invention is shown as applied to a machine of the seam welder type, comprising a support 10 which provides a journal carrier 11 for the electrode 12. The support 10 may be attached to or form part of the movable head of a seam welding machine. In the particular embodiment shown, the electrode comprises a disk having flat opposite surfaces 13, 14, the welding face being of predetermined width as defined by angular walls connecting the welding face with the opposite surfaces 13, 14.

In standard construction, at least the surface 13 is finished, so that it will accurately fit with an adjoining finished surface formed on a flange 15 carried by a shaft 16 which drives the electrode 12. The electrode 12 is preferably attached to the flange 15 by means of bolts 17, the heads of which are countersunk into the surface 14.

As best seen in Figure 5, the shaft 16 has a shoulder 18 formed thereon, between which and a nut 19 is secured a worm wheel 20. The worm wheel 20 meshes with a worm 21 which may be driven in any suitable manner.

The surface of the flange 15 opposite to that engaged by the electrode surface 13 is also finished and bears against a finished surface formed on a hub 22 carried by the support 10. A thrust bearing 23 is interposed between a surface of the worm wheel 20 and a shoulder 24 formed in a housing 25. Thus, by adjustment of the nut 19, end play of the shaft 16 may be varied to suit requirements. Generally, a slight amount of end play is provided when the machine is "cold," that is, prior to use, so as to accommodate for expansion caused by heat developed during the welding operation.

The support 10, and the electrode 12 carried thereby, may be moved in a direction toward or away from a companion electrode or contact bar (not shown) by any suitable means.

Carried by the support 10 is a plate 30 which may be fastened to the support by means of bolts (not shown) or in any other suitable manner. The plate 30 is insulated from the support 10, and rigidly carries a rod 31, the axis of which extends transversely with respect to the axis of the shaft 16.

Slidable along the rod 31 is a support housing 32 which has portions extending on opposite sides of the axis of the rod. On one side of this axis, the support housing 32 has an aperture for receiving a shaft 33 which has an eccentric portion 34 on which is journalled a roller 35. The roller 35 is adapted to engage the peripheral surface of the electrode, for a purpose later to be explained. It will be appreciated that rotation of the shaft 33 will cause the roller to approach or recede from the peripheral surface of the electrode 12.

Figures 2, 3:
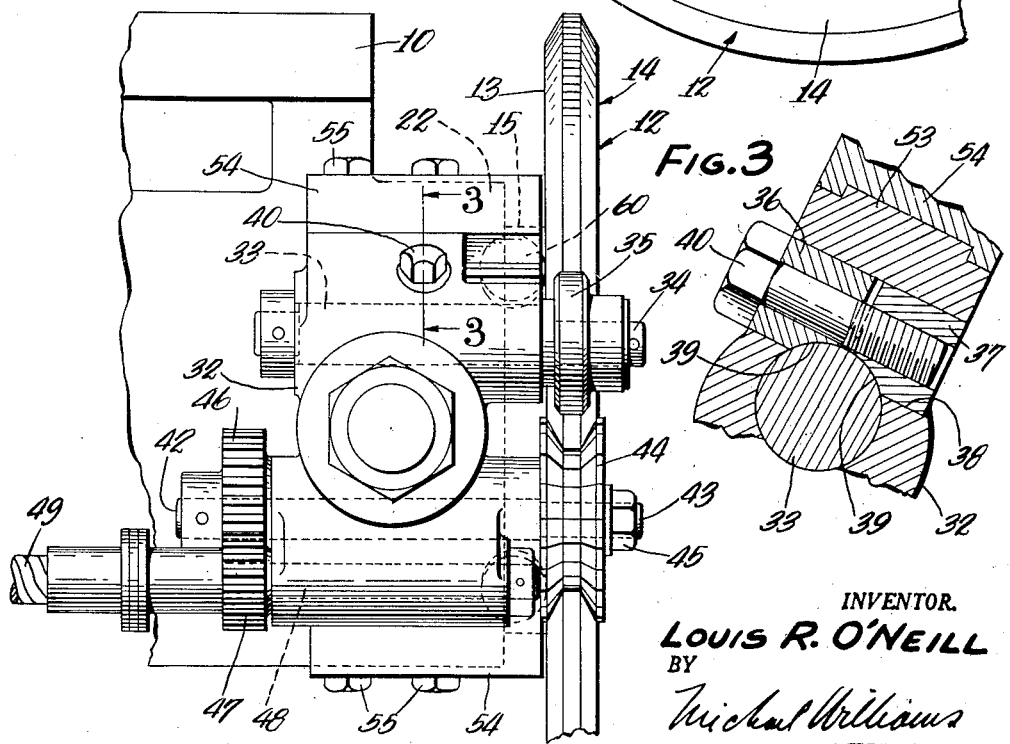
Figure 2 is a broken side elevational view of the parts shown in Figure 1.
Figure 3 is a fragmentary sectional view, drawn to a larger scale, and corresponding generally to the line 3—3 of Figure 2.

Lock means are provided for securing the shaft 33 in adjusted position, and as here shown, referring particularly to Figure 3, the lock means comprise a pair of tubular members 36, 37 slidably mounted within an aperture 38 formed in the support housing 32. Each of the tubular members 36 and 37 has an arcuate recessed portion 39 to receive an adjoining portion of the shaft 33. The tubular member 37 is formed with internal screw threads adapted to receive the threaded end of a bolt 40. When the bolt 40 is drawn up, the tubular members 36, 37 are drawn together to clamp the shaft 33 therebetween. It will be appreciated that lock means other than that herein shown may be used to secure the shaft 33 in adjusted position.

On the other side of the axis of the rod 31, the support housing 32 is formed with an aperture 41 within which is journalled a shaft 42, the latter having a reduced end 43 on which is secured means 44 for dressing the electrode 12. Conveniently, a nut 45 clamps the means 44 against the shoulder formed by the reduced end 43. As here shown and preferred, the means 44 takes the form of a milling cutter having a cutting profile complementary to the profile of the peripheral portion of the electrode 12, although it will be understood that a rotary dressing tool in the form of an abrasive wheel may be employed.

Secured to the opposite end of the shaft 42 is a gear 46 meshing with a gear 47 carried by a shaft 48 journalled in the support housing 32. The shaft 48 may be rotated in any suitable manner, and as here shown, rotation is effected by connecting the gear 47 to a flexible shaft 49 which is connected to the shaft of a motor (not shown). Preferably, an insulating coupling is interposed between the shafts 48 and 49.

The support housing 32, and all parts carried thereby, is urged in the direction toward the electrode 12, by means of a coil spring 50 encircling the rod 31, pressure of the spring being adjusted by a nut 51, a lock nut 52 holding the nut 51 in adjusted position.

The extremities of the support housing 32, on opposite sides of the axis of the rod 31, are formed with tongues 53, each adapted to seat in a groove formed in a slide 54. Bolts 55 pass through apertures 56 in a respective slide 54, having their threaded ends received within screw-threaded apertures formed in the support housing 32. The apertures 56 are of a greater diameter than the shank of the bolt, so that adjustment of the slide in line with the tongue 53 is provided for. This adjustment, it will be appreciated, will be toward and away from the electrode 12, along a line generally parallel with the axis of the electrode.

Each of the slides 54 has an offset portion 57 formed with an aperture 58, the part of the aperture at the offset portion 57 being threaded to receive the threaded end of a shoulder bolt 59. A roller 60 is journalled on the enlarged part of the bolt 59.

The slides 54 are adjusted along the tongues 53 any desired amount within limits defined by the size of the apertures 56, so that the rollers 60 may bear against the finished face 13 of the electrode 12 to take up any excessive end play in the shaft 16. It will be obvious that the rollers 60 may be pressed against the face 13, to move the electrode 12 and its shaft 16 to the right, as viewed in Figure 5, until the thrust washer 23 opposes any further movement. Preferably, a slight amount of play is allowed for when the machine is "cold" to accommodate for expansion.

In operation, the electrode 12 and the cutter 44 are preferably rotated in opposite directions, as suggested by the arrows in Figure 1. Also, preferably, the cutter 44 is rotated at a higher speed than the electrode 12.

It will be appreciated that the spring 50 constantly urges the support housing 32 in the direction toward the electrode 12, this movement being limited by abutment of the roller 35 with the periphery of the electrode. Thus, the position of the cutter 44 relative to the electrode is defined by adjustment of the shaft 33 which carries the roller 35.

From the foregoing, it will be appreciated that the roller 35 may be so adjusted that the cutter will trim the peripheral surface and the angular side surfaces at the peripheral portion of the electrode. Or, as shown in Figure 6, the cutter may be adjusted to trim only the angular side surfaces to take care of "mushrooming" of the electrode. This adjustment is sometimes preferred when the pickup on the electrode from the work aids in the welding operation.

My invention thus provides means for maintaining the electrode in proper condition largely because it is at all times properly aligned with the electrode. For example, the bearing for the shaft 16 necessarily must provide for expansion of the parts during the welding operation. Thus, when the machine is relatively cold, the allowable tolerances, when multiplied throughout the length of the shaft, plus any deflection, cause the electrode to tilt, and this tilt may vary, depending upon the condition of the bearings and the pressure used for welding. However, regardless of the amount of tilt, the rollers 60 will rotate the support housing 32 about the shaft 31 a correct amount to correspond to the tilt of the electrode. In this way, the electrode will be trimmed true, instead of off-center, as is the case with prior art constructions.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. Means for use with a resistance welding machine having a rotary electrode, comprising: dressing means engageable with a peripheral portion of said electrode; resilient means urging said dressing means toward engagement with said electrode; and means engageable with a peripheral portion of said electrode spaced from said first mentioned peripheral portion for predetermining engagement of said dressing means with said electrode.

2. Means for use with a resistance welding machine having a rotary electrode, comprising: support means movable in a direction toward and away from said electrode; dressing means carried by said support means for dressing a peripheral portion of said electrode; resilient means, urging said support means toward said electrode; and means carried by said support means and engageable with the peripheral surface of said electrode, for predetermining relative position of said dressing means and said electrode.

3. Means for use with a resistance welding machine having a rotary electrode that is subject to a tilting action during operation, and having a peripheral portion of a predetermined shape, comprising: dressing means having a dressing profile complementary to said predetermined shape, said dressing means being mounted for swinging movement about an axis transverse to the axis of said electrode; roller means on opposite sides of said dressing means axis and engageable with a side surface of said electrode, said roller means functioning as followers whereby tilting action of said electrode will cause corresponding movement of said dressing means.

4. Means for use with a resistance welding machine having a rotary electrode that is subject to a tilting action during operation, and having a peripheral portion of a predetermined shape, comprising: support means, slidable along and swingable about an axis transverse with respect to the axis of said electrode, a milling cutter having a cutting profile complementary to said predetermined shape and being adapted to maintain said predetermined shape, resilient means urging said support means in a direction toward said electrode so that said milling cutter may engage said electrode for milling action, roller means, carried by said support and engageable with the peripheral surface of said electrode, said roller means being adjustable to adjust relative positions of said cutter and said electrode, and roll means carried by said support means on opposite sides of its axis, said roll means being engageable with a side surface of said electrode to cause said support means to swing in accordance with the tilting of said electrode.

5. Means for use with a resistance welding machine having a rotary electrode, comprising: support means movable in a direction toward and away from said electrode; resilient means for urging said support means in a direction toward said electrode; a rotary element carried by said support means and engageable with said electrode at its peripheral surface; and a roller carried by said support means and engageable with the peripheral surface of said electrode to limit movement of said support means in a direction toward said electrode, said roller being adjustable with respect to said support means so that the relation of said rotary element relative to said electrode may be varied.

6. Means for use with a resistance welding machine having a rotary electrode, comprising: dressing means rotatable about an axis generally parallel to but spaced from the axis of said electrode, and engaging said electrode adjacent its periphery for maintaining a predetermined shape at said periphery; means urging said dressing means toward said electrode; and means providing a follower connection between said electrode and said dressing means, whereby said dressing means is held in dressing alignment with said electrode during tolerable shifting of said electrode.

7. Means for use with a resistance welding machine having a rotary electrode, comprising: dressing means engaging said electrode adjacent its periphery for maintaining a predetermined shape at said periphery, said dressing means being mounted for bodily shifting movement relative to said electrode; and follower means having portions engaging said electrode at opposite sides of its axis, said follower means being connected to said dressing means to effect bodily shifting of said dressing means in accordance with shifting action of said electrode.

LOUIS R. O'NEILL.

REFERENCES CITED

The following references are of record in the file of this patent:

UNITED STATES PATENTS

| Number | Name | Date |
| --- | --- | --- |
| 837,296 | Fulton et al. | Dec. 4, 1906 |
| 1,822,371 | Piach et al. | Sept. 8, 1931 |
| 1,862,108 | Bruechuer | June 7, 1932 |
| 2,065,511 | Black | Dec. 29, 1938 |
| 2,337,037 | Fentress | Dec. 21, 1943 |

FOREIGN PATENTS

| Number | Country | Date |
| --- | --- | --- |
| 282,960 | Great Britain | Jan. 5, 1928 |
| 355,755 | Germany | July 1, 1922 |
| 310,822 | Italy | Sept. 8, 1933 |